R. H. LECKY.
Car Truck.
No. 2,027. Reissued July 11, 1865.
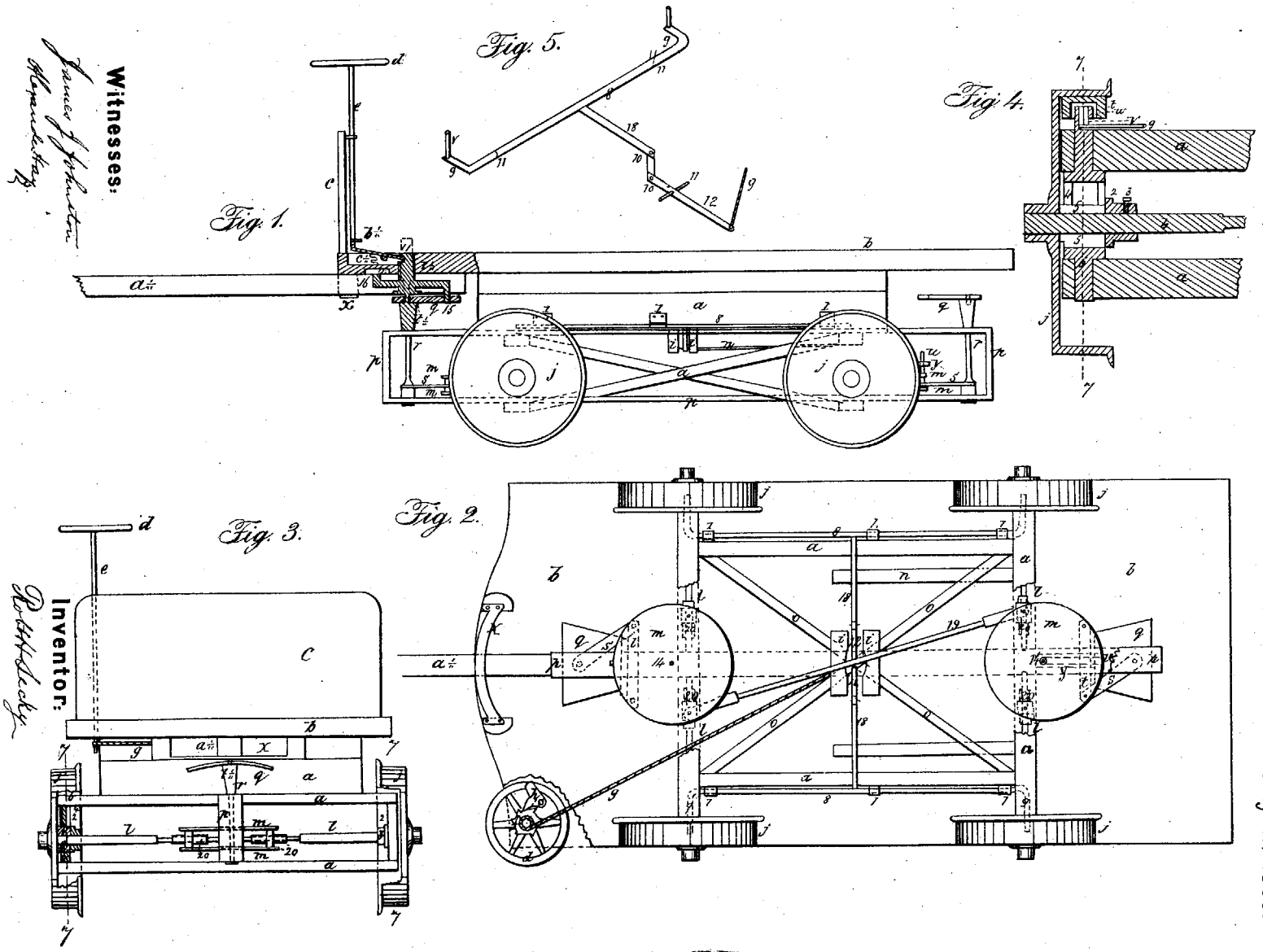
Witnesses:
James J. Johnston
Alexander Hay
Inventor:
Robert H. Lecky
AM. PHOTO-LITHO. CO. N.Y. (OSBORNE'S PROCESS.)

UNITED STATES PATENT OFFICE.

ROBERT. H. LECKY, OF ALLEGHENY, PENNSYLVANIA.

IMPROVEMENT IN TRUCKS FOR STREET-RAILWAYS.

Specification forming part of Letters Patent No. 42,202, dated April 5, 1864; Reissue No. 2,027, dated July 11, 1865.

*To all whom it may concern:*

Be it known that I, ROBERT H. LECKY, of Allegheny City, (formerly of McClure,) in the county of Allegheny and State of Pennsylvania, have invented certain new and useful Improvements in Trucks for Street-Railways; and I do hereby declare that the following is a full and exact description thereof, reference being had to the accompanying drawings, and to the letters of reference marked thereon.

The nature of my invention consists in arranging the axles of the wheels of trucks for street-railways so that the inner end of axle or axles of the wheel or wheels traveling on the short or inner curve of the track will move back or forward a greater distance than the inner end of the axle or axles of the wheel or wheels which travel on the long or outer curve of the track, thereby adjusting the position of the wheels by the movements of their axles to suit the curve of their track, the whole being constructed, arranged, and operating substantially in the manner hereinafter described.

In the accompanying drawings, Figure 1 represents a side view of the truck and the bottom of the car. Fig. 2 represents a bottom view of the truck. Fig. 3 represents an end view of the truck. Fig. 4 represents a section of the frame, wheel, bearing, and brake. Fig. 5 represents the arrangement of the levers for the brakes for one side of the truck.

In the accompanying drawings, *a* represents the frame of the truck.

*b* represents the bottom of the car, which is made so that it can swing around on the truck, which bottom, with its attachment, is constructed, arranged, and operated in the ordinary way, with the exception of the means used for holding the bottom in the desired position.

*a'* represents the tongue, which is secured to the bottom of the car by means of the flanged tube *x'*, in which is placed the catch 17, which is furnished with tongues or points 15, *t'*, and 16. The flanged tube 17 has a slot in the lower end of it for the purpose of allowing the arms of the catch to move up and down in it when unshipping the catch from the guide *q*. In the upper side of the bottom *b*, is a recess in which is placed a spring, *c'*, and a lever, *b'*. The spring *c'* is used for holding the lever in the desired position. One end of the lever *b'* is placed in a recess made in the catch 17, and is used for unshipping the catch 17 from the guide *q*, which is placed on the upper end of the shaft *r*, which is held in the proper position by means of the frame *p*, which is secured to the frame of the truck. The guide *q* is made in the form of a segment of a circle, as represented in Fig. 3. To the shaft *r* is attached a lever, *s*, which is attached to a link, *t*, one end of which is attached to the disks *m*, which are secured to the frame *p* by means of the bolt 14, which serves as the axis of the disks, between which are placed the swivel-bearings 20, for the inner ends of the axles *l* of the wheels *j*.

It will be observed that the axis of the swivel-bearings 20 are in a line with the plane of the axles *l* of the wheels *j*, outside of which line and plane is placed the axis 14 of the disks *m*. By this arrangement of the axis of the swivel-bearings 20 and disks *m* the inner end of the axles of the wheels traveling on the short or inner curve of the track will move a greater distance than the inner end of the axles of the wheels traveling on the long or outer curve of the track, so that in moving the disks *m*, or their equivalents, (levers,) the axles *l* and wheels *j* will always be in the proper position for adjusting them to the radius of the curve of their track.

6 represents swivel-bearings, the axis of which is placed in the transverse timbers of the frame *a* and central to the periphery of the wheels *j*, as indicated by the dotted lines 7, for the purpose of turning the wheels to suit any curve without imparting to them any back or forward motion other than that given by the drawing or driving power.

5 represents the journal-boxes of the axles *l*.

4 represents springs.

The journal-boxes 5 and the springs 4 are placed in the swivel-bearings 6; but I do not confine myself to this arrangement, for it may be varied to suit the taste and skill and judgment of the mechanic.

The axles *l* are held in their proper position to the swivel-bearings 6 by means of collars, (marked 2,) which are secured on the axles *l* by means of set-screws, (marked 3.) The upper end of the swivel-bearings 6 are made hollow for the purpose of receiving the plungers *v*.

*z* represents the brakes, in which are placed cups, (marked *w*,) which are fitted to the axis of the swivel-bearings 6. By means of the cups *w* the brakes are allowed to adjust themselves on the ends of the axis of the swivel-bearings to suit the various positions assumed by the wheels.

The disks *m* at each end of the truck and the other parts attached thereto are united and connected with each other in their action by means of the rod marked 19, as represented in Fig. 2.

To one of the transverse timbers of the truck are attached springs, (marked *y*,) between which is placed a pin, *u*, which is secured to the disk *m*. (See Figs. 1 and 2.) These springs and pin are used for the purpose of holding the wheels *j* in line with each other, as represented in Fig. 2.

The levers for operating the brakes are made in the form represented in Fig. 5, and are secured to the truck by means of the pieces marked 1. The point marked 11 represents the fulcrum of the levers.

It will be observed that Fig. 5 represents an arrangement of levers for the brakes on one side of the truck. A duplicate set of these levers are used for the other side of the truck. To the levers 12 are attached a rope or chain, *g*, which is used and operated in the ordinary manner for operating brakes. The manner and means for operating are represented by the parts marked *d*, *e*, *f*, and *h*, which are secured to the dash-board *c* and the bottom *b* of the car-body. The fulcrum of the parts 12 of the levers for operating the brakes are placed in the pieces marked *i*. The brakes are thrown off from the wheels by their own weight and by the springs marked *n*, which are secured to a transverse timber of the truck. The front end of the springs *n* bear on the part of the levers marked 18.

O represents braces of the truck. It will be observed, by reference to Fig. 4, that the points of arms 9 of the levers for the brakes are placed under the plungers *v*, openings being made in the axis of the swivel-bearings 6 for that purpose.

I wish it to be clearly understood that I do not confine myself to any particular form or size of the various parts herein described and represented, but the arrangement of the parts must be substantially the same as herein set forth.

Having thus described the construction of the truck and the various parts attached thereto, I will now proceed to describe the operation of my improvement, which is as follows: When I desire to throw the brakes up against the inner surface of the rim of the wheels, I wind up the rope or chain *g* by means of the wheel *d* and shaft *e*, which will draw up the long end of the lever 12, which will throw down the part marked 18, and throw up the points of the arms 9, which will raise the plungers *v*, which will press the brakes *z* against the wheels. When turning a curve, the tongue *a'* will (by turning the horses attached to it in a line with the curve) cause the tongue 15 of the catch 17 to turn the guide *q* on the shaft *r*, which will operate the levers *s*, which will turn the disks *m* by means of the link *t* and connecting-rod 19, in the desired direction for adjusting the wheels *j* and their axles *l* to the radius of the curves of their tracks.

When I desire to turn the body of car around on the truck, so that the dash-board *c* will be at the opposite end of the truck, I press down the lever *b'*, which will raise up the catch 17, which will release the tongues 15 and *t'* from the guide *q*, and cause the tongue 16 to enter the recess O' in the under side of the bottom, which will hold the tongue *a'* and the tongues 15 and *t'* of the catch 17 in a straight line with the body of the car and the notches made in the guide *q* for the reception of the tongues 15 and *t'*.

Having thus described the nature, construction, and operation of my improvement in trucks for street-railways, what I claim as of my invention is—

1. Arranging the axles with relation to the wheels so that the inner end of the axles of the wheels which travel on the short or inner curve of the track will, in turning curves, move more than the inner end of the axles of the wheels which travel on the long or outer curve of the track, said axles and wheels being operated substantially in the manner and by the means herein described, and for the purpose set forth.

2. The combination of the swivel-bearings 6 and 20 with the disks *m*, (or their equivalents—levers,) axles *l*, wheels *j*, and connecting rod 19, operated by the means and in the manner substantially as described, for the purpose set forth.

3. Securing the tongue *a'* to the bottom *b* by means of the flanged tube *x'* and support *x*, as herein described, and for the purpose set forth.

4. The use of the catch 17 and guide *q*, when used in combination with the tongue *a'*, flanged tube *x'*, bottom *b*, and lever *b'*, arranged and operating substantially as herein described, and for the purpose set forth.

5. The arrangement of the brakes *z*, cup *w*, plungers *v*, and levers 9, 8, 18, and 12, arranged and operating substantially as herein described, and for the purpose set forth.

R. H. LECKY.

Witnesses:
JAMES J. JOHNSTON,
ALEXANDER HAYS.